(12) United States Patent
Zhao et al.

(10) Patent No.: US 9,689,485 B1
(45) Date of Patent: Jun. 27, 2017

(54) DIFFERENTIAL ASSEMBLY WITH AXLE TORQUE VECTORING

(71) Applicant: GM Global Technology Operations LLC, Detroit, MI (US)

(72) Inventors: Shaun X. Zhao, Novi, MI (US); Michael J. Palecek, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/172,434

(22) Filed: Jun. 3, 2016

(51) Int. Cl.
| | |
|---|---|
| *B60K 6/26* | (2007.10) |
| *F16H 48/36* | (2012.01) |
| *F16H 37/08* | (2006.01) |
| *F16H 3/72* | (2006.01) |
| *B60K 6/365* | (2007.10) |
| *B60K 6/547* | (2007.10) |

(52) U.S. Cl.
CPC ............ *F16H 48/36* (2013.01); *B60K 6/26* (2013.01); *B60K 6/365* (2013.01); *B60K 6/547* (2013.01); *F16H 3/724* (2013.01); *F16H 37/082* (2013.01); *B60Y 2200/92* (2013.01); *B60Y 2300/188* (2013.01); *B60Y 2300/60* (2013.01); *B60Y 2400/73* (2013.01); *B60Y 2400/80* (2013.01); *B60Y 2400/81* (2013.01); *F16H 2048/364* (2013.01); *F16H 2048/368* (2013.01); *Y10S 903/906* (2013.01); *Y10S 903/911* (2013.01); *Y10S 903/93* (2013.01)

(58) Field of Classification Search
None
See application file for complete search history.

(56) References Cited

U.S. PATENT DOCUMENTS

| | | | | |
|---|---|---|---|---|
| 5,396,968 A | * | 3/1995 | Hasebe | B60K 1/02 180/233 |
| 6,854,571 B2 | * | 2/2005 | Iwazaki | B60T 1/062 188/161 |
| 6,964,311 B2 | * | 11/2005 | Yang | B60K 7/0007 180/65.1 |
| 7,247,117 B2 | * | 7/2007 | Forster | B60K 17/046 180/65.6 |
| 9,033,839 B2 | * | 5/2015 | Rossey | B60K 1/00 475/150 |
| 2004/0079568 A1 | * | 4/2004 | Bell | B60K 6/26 180/65.6 |
| 2006/0025267 A1 | * | 2/2006 | Gradu | F16H 48/08 475/6 |

(Continued)

*Primary Examiner* — Justin Holmes

(57) ABSTRACT

A differential assembly for vehicle includes a differential, a prop shaft configured to drivingly couple the differential to a motive power source, a first half shaft configured to drivingly couple the differential to a first road wheel, and a second half shaft configured to drivingly couple the differential to a second road wheel. The differential assembly also includes a first electric machine having a first output shaft and a second electric machine having a second output shaft. The differential assembly additionally includes a first gearing assembly configured to selectively impose a controlled speed ratio between the first half shaft and the first output shaft and a second gearing assembly configured to selectively impose a controlled speed ratio between the second half shaft and the second output shaft.

20 Claims, 8 Drawing Sheets

(56) References Cited

U.S. PATENT DOCUMENTS

| | | | | |
|---|---|---|---|---|
| 2006/0025273 A1* | 2/2006 | Gradu | ................... | B60K 23/04 |
| | | | | 475/225 |
| 2006/0172846 A1* | 8/2006 | Gassmann | ........... | B60K 17/165 |
| | | | | 475/221 |
| 2010/0234161 A1* | 9/2010 | Kato | ................... | B60K 17/165 |
| | | | | 475/205 |

\* cited by examiner

DIFFERENTIAL ASSEMBLY WITH AXLE TORQUE VECTORING

TECHNICAL FIELD

This disclosure relates to a differential assembly for an automotive vehicle. Particularly, the disclosure relates to a differential assembly in a hybrid electric vehicle.

INTRODUCTION

Vehicle powertrains generally incorporate an engine, a transmission, and a differential. The differential is a mechanism which receives drive torque from the transmission and distributes the torque to at least two half shafts, which in turn drive the road wheels of the vehicle. The differential is configured to permit the respective half shafts to rotate at differing speeds, and thus accommodate different road wheel speeds, e.g. during a turn.

SUMMARY OF THE INVENTION

A vehicle according to the present disclosure includes an engine, a differential, a prop shaft drivingly coupling the differential to the engine, a first road wheel, a first half shaft drivingly coupling the differential to the first road wheel, a second road wheel, and a second half shaft drivingly coupling the differential to the second road wheel. The vehicle also includes a first electric machine having a first output shaft and a second electric machine having a second output shaft. The vehicle additionally includes a first planetary gear set having a first sun gear, a first planet carrier, and a first ring gear. The first sun gear is coupled with the first output shaft for co-rotation, and the first planet carrier is coupled with the first half shaft for co-rotation. The vehicle also includes a first brake configured to selectively hold the first ring gear against rotation. The vehicle further includes a second planetary gear set having a second sun gear, a second planet carrier, and a second ring gear. The second sun gear is coupled with the second output shaft for co-rotation, and the second planet carrier is coupled with the second half shaft for co-rotation. The vehicle also includes a second brake configured to selectively hold the second ring gear against rotation.

According to various embodiments, the vehicle includes a controller configured to selectively control the first brake in a first brake engaged state with the first ring gear held against rotation and in a first brake disengaged state with the first ring gear not held against rotation. The controller is also configured to selectively control the second brake in a second brake engaged state with the second ring gear held against rotation and in a second brake disengaged state with the second ring gear not held against rotation. The controller is further configured to selectively control the first electric machine to provide drive torque and to provide resistive torque, and to selectively control the second electric machine to provide drive torque and to provide resistive torque.

According to various embodiments, the controller is further configured to, in response to at least one sensor input corresponding to a torque boost condition or an emergency braking condition, control the first brake in the first brake engaged state, control the second brake in the second brake engaged state, and control the first electric machine and the second electric machine to provide torque and to rotate at a same speed.

According to various embodiments, the controller is further configured to, in response to at least one sensor input corresponding to an electric drive condition, control the first brake in the first brake engaged state, control the second brake in the second brake engaged state, and control the first electric machine and the second electric machine to provide drive torque in the absence of drive torque from the prop shaft.

According to various embodiments, the controller is further configured to, in response to at least one sensor input corresponding to a parking assist condition or a redundant steering condition, control the first brake in the first brake engaged state, control the second brake in the second brake engaged state, and to control the first electric machine to rotate at a first speed and the second electric machine to rotate at a second speed, distinct from the first speed, to produce a speed differential between the first half shaft and the second half shaft.

According to various embodiments, the controller is further configured to, in response to at least one sensor input corresponding to a targeted torque condition, control the first brake in the first brake engaged state, control the second brake in the second brake disengaged state, and to control the first electric machine to deliver drive torque to the first road wheel.

According to various embodiments, the controller is further configured to, in response to at least one sensor input corresponding to a stability control condition, control the first brake in the first brake engaged state, control the second brake in the second brake disengaged state, and to control the first electric machine to deliver resistive torque to the first road wheel.

A differential assembly for vehicle according to the present disclosure includes a differential, a prop shaft configured to drivingly couple the differential to a motive power source, a first half shaft configured to drivingly couple the differential to a first road wheel, and a second half shaft configured to drivingly couple the differential to a second road wheel. The differential assembly also includes a first electric machine having a first output shaft and a second electric machine having a second output shaft. The differential assembly additionally includes a first gearing assembly configured to selectively impose a controlled speed ratio between the first half shaft and the first output shaft and a second gearing assembly configured to selectively impose a controlled speed ratio between the second half shaft and the second output shaft.

According to various embodiments, the first gearing assembly includes a first planetary gear set having a first sun gear coupled with the first output shaft for co-rotation, a first planet carrier coupled with the first half shaft for co-rotation, and a first ring gear. In such embodiments, the second gearing assembly includes a second planetary gear set having a second sun gear coupled with the second output shaft for co-rotation, a second planet carrier coupled with the second half shaft for co-rotation, and a second ring gear. In such embodiments, the vehicle additionally includes a first brake configured to selectively hold the first ring gear against rotation and a second brake configured to selectively hold the second ring gear against rotation.

According to various embodiments, the differential assembly additionally includes a housing. In such embodiments, the differential, the first half shaft, the second half shaft, the first electric machine, the second electric machine, the first gearing assembly, and the second gearing assembly are disposed at least partially within the housing.

According to various embodiments, the differential assembly additionally includes a controller. The controller is configured to control the first gearing assembly to selectively operate in a first gearing assembly first mode with the controlled speed ratio between the first half shaft and the first output shaft and in a first gearing assembly second mode with no controlled speed ratio between the first half shaft and the first output shaft. The controller is also configured to control the second gearing assembly to selectively operate in a second gearing assembly first mode with the controlled speed ratio between the second half shaft and the second output shaft and in a second gearing assembly second mode with no controlled speed ratio between the second half shaft and the second output shaft.

According to various embodiments, the controller is further configured to, in response to a first set of operating conditions, control the first gearing assembly in the first gearing assembly first mode and control the second gearing assembly in the second gearing assembly first mode.

According to various embodiments, the first set of operating conditions includes a torque boost operating condition or an emergency braking operating condition, and the controller is further configured to control the first electric machine and the second electric machine to rotate at a same speed and to provide drive torque.

According to various embodiments, the first set of operating conditions includes an electric drive condition, and the controller is further configured to control the first electric machine and the second electric machine to rotate at a same speed and to provide drive torque with the motive power source providing no drive torque.

According to various embodiments, the first set of operating conditions includes a redundant steering condition or a parking assist condition, and the controller is further configured to control the first electric machine to rotate at a first speed and the second electric machine to rotate at a second speed, distinct from the first speed, to produce a speed differential between the first road wheel and the second road wheel.

According to various embodiments, the controller is further configured to, in response to a second set of operating conditions, control the first gearing assembly in the first gearing assembly first mode and control the second gearing assembly in the second gearing assembly second mode.

According to various embodiments, the second set of operating conditions includes a targeted torque condition, and the controller is further configured to control the first electric machine to deliver drive torque to the first road wheel.

According to various embodiments, the second set of operating conditions includes a stability control condition, and the controller is further configured to control the first electric machine to deliver resistive torque to the first road wheel.

A method of controlling a vehicle according to the present disclosure, where the vehicle includes a motive power source, a differential, a prop shaft drivingly coupling the motive power source to the differential, a first road wheel, a second road wheel, a first half shaft drivingly coupling the differential to the first road wheel, a second half shaft drivingly coupling the differential to the second road wheel, a first electric machine having a first output shaft, a second electric machine having a second output shaft, a first gearing assembly configured to selectively impose a controlled speed ratio between the first half shaft and the first output shaft, and a second gearing assembly configured to selectively impose a controlled speed ratio between the second half shaft and the second output shaft, includes, in response to a first operating condition being satisfied, controlling the first gearing assembly to impose the controlled speed ratio between the first half shaft and the first output shaft and controlling the second gearing assembly to impose no controlled speed ratio between the second half shaft and the second output shaft. The method additionally includes, in response to the first operating condition not being satisfied, controlling the first gearing assembly to impose no controlled speed ratio between the first half shaft and the first output shaft and controlling the second gearing assembly to impose no controlled speed ratio between the second half shaft and the second output shaft.

According to various embodiments, the method additionally includes, in response to a second operating condition being satisfied, controlling the first gearing assembly to impose the controlled speed ratio between the first half shaft and the first output shaft and controlling the second gearing assembly to impose the controlled speed ratio between the second half shaft and the second output shaft.

Embodiments according to the present disclosure provide a number of advantages. For example, embodiments according to the present disclosure may provide a vehicle with improved mobility and handling, improved fuel economy, and system redundancy, thus increasing customer satisfaction.

The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
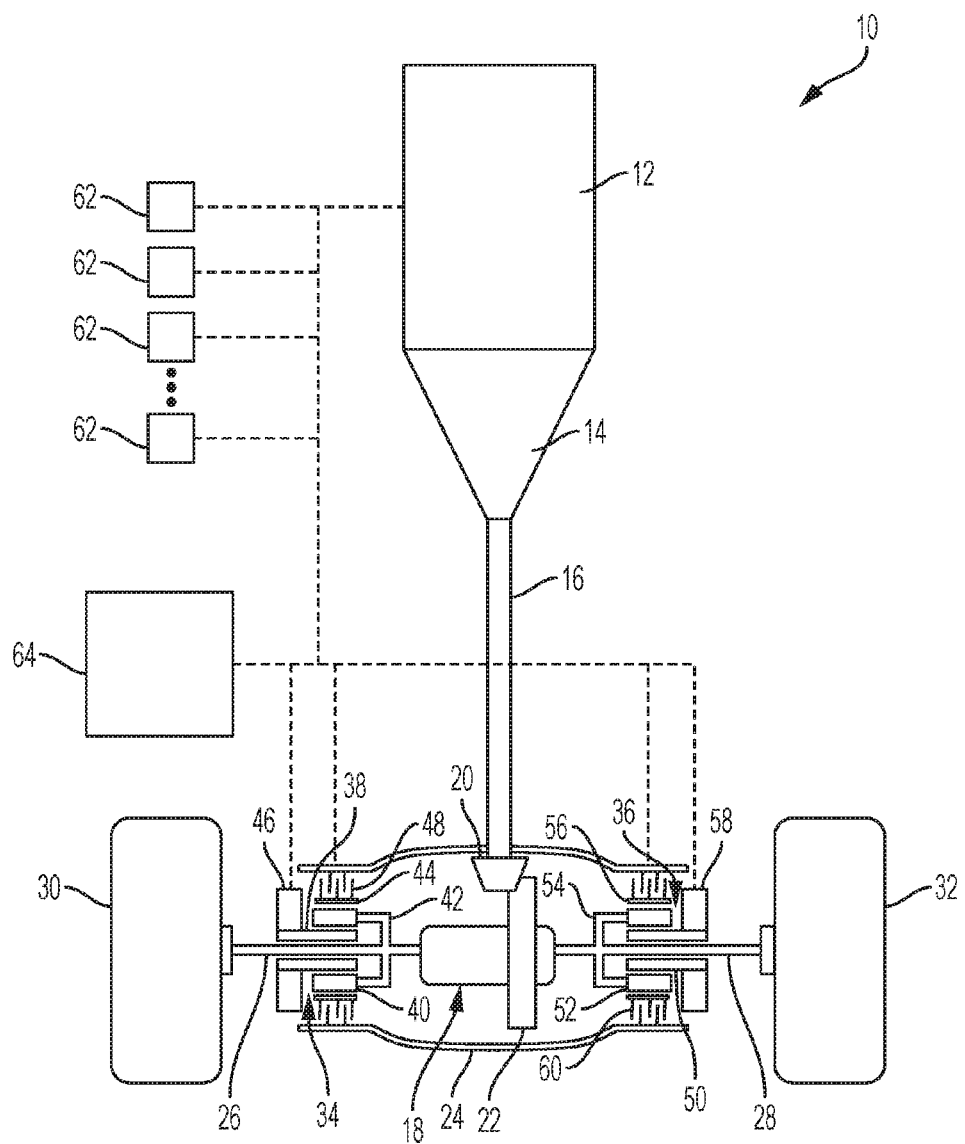
FIG. 1 is a schematic illustration of a vehicle according to the present disclosure.

Referring now to FIG. 1, a vehicle 10 according to the present disclosure is shown. In this embodiment the vehicle 10 has a rear-wheel drive configuration and, as such, only the rear wheels are depicted. Other contemplated embodiments may have a front-wheel drive or an all-wheel drive configuration.

The vehicle 10 includes an internal combustion engine 12. The engine 12 is drivingly coupled to a transmission 14. The transmission 14 is preferably a multi-speed automatic transmission or a continuously variable transmission (CVT); however, in other embodiments other appropriate transmission mechanisms may be used.

The transmission 14 has an output shaft 16, which may be referred to as a propeller shaft or prop shaft. The prop shaft 16 is drivingly coupled to a differential 18. In this embodiment, the differential 18 is a bevel gear differential, having an input pinion 20 in meshing engagement with a ring gear 22. However, in other embodiments, other types of differential apparatuses may be used. The differential 18 and additional components, as will be discussed below, are retained within a housing 24.

The differential 18 is drivingly coupled to a first half shaft 26 and to a second half shaft 28, which may be referred to as a left half shaft and a right half shaft, respectively. The first half shaft 26 is drivingly coupled to a first road wheel 30, which may be called a left road wheel. The second half shaft 28 is drivingly coupled to a second road wheel 32, which may be called a right road wheel. The differential 18 is configured to permit the first half shaft 26 and the second half shaft 28 to rotate at differing speeds, e.g. during a turn.

A first gearing assembly 34 is arranged proximate the first half shaft 26, and a second gearing assembly 36 is arranged proximate the second half shaft 28. A gearing assembly refers to a collection of rotating elements and shift elements configured to impose specified speed relationships among the rotating elements.

Some speed relationships, which may be called fixed speed relationships, are imposed regardless of the state of any shift elements. Other speed relationships, which may be called selective speed relationships, are imposed only when particular shift elements are fully engaged. A linear speed relationship exists among an ordered list of rotating elements when i) the first and last rotating element in the group are constrained to have the most extreme speeds, ii) the speeds of the remaining rotating elements are each constrained to be a weighted average of the first and last rotating element, and iii) when the speeds of the rotating elements differ, they are constrained to be in the listed order, either increasing or decreasing. The speed of an element is positive when the element rotates in one direction and negative when the element rotates in the opposite direction.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes. Two rotating elements are coupled if they are either fixedly coupled or selectively coupled. Coupled rotating elements may be either directly coupled to one another or indirectly coupled, e.g. via an intervening rotating element.

A simple planetary gear set is a type of gearing assembly that imposes a fixed linear speed relationship among the sun gear, the planet carrier, and the ring gear. Other known types of gearing assemblies also impose a fixed linear speed relationship among three rotating elements. For example, a double pinion planetary gear set imposes a fixed linear speed relationship between the sun gear, the ring gear, and the planet carrier.

In this embodiment, the first gearing assembly 34 includes a first simple planetary gear set with a first sun gear 38, at least one first planet gear 40 carried by a first planet carrier 42, and a first ring gear 44. The first planet carrier 42 is fixedly coupled to the first half shaft 26.

A first electric machine 46, which may alternatively be referred to as a motor, a generator, or a motor-generator, is arranged proximate the first gearing assembly 34. The first electric machine 46 has an output shaft fixedly coupled to the first sun gear 38. The first electric machine 46 is preferably configured to selectively provide drive torque, i.e. having a same sign as engine torque, and resistive torque, i.e. having an opposite sign from engine torque. The first electric machine 46 may be configured to provide resistive torque in the form of regenerative braking to convert kinetic energy into stored electric energy.

A first brake 48 is disposed between the first ring gear 44 and the housing 24. The first brake 48 is configured to, when engaged, hold the first ring gear 44 against rotation.

The second gearing assembly 36 includes a second simple planetary gear set with a second sun gear 50, at least one second planet gear 52 carried by a second planet carrier 54, and a second ring gear 56. The second planet carrier 54 is fixedly coupled to the second half shaft 28.

A second electric machine 58 is arranged proximate the second gearing assembly 36. The second electric machine 58 has an output shaft fixedly coupled to the second sun gear 50. The second electric machine 58 is preferably configured to selectively provide drive torque, i.e. having a same sign as engine torque, and resistive torque, i.e. having an opposite sign from engine torque. The second electric machine 58 may be configured to provide resistive torque in the form of regenerative braking to convert kinetic energy into stored electric energy.

A second brake 60 is disposed between the second ring gear 56 and the housing 24. The second brake 60 is configured to, when engaged, hold the second ring gear 56 against rotation.

In the embodiment of FIG. 1, the differential 18, first gearing assembly 34, second gearing assembly 36, first electric machine 46, and second electric machine 58 are all retained within the housing 24. However, in other embodiments contemplated within the scope of the preset disclosure, the first gearing assembly 34, second gearing assembly 36, first electric machine 46, and/or the second electric machine 58 may be disposed outside the housing 24. As an example, the first gearing assembly 34 and first electric machine 46 may be positioned outside the housing 24 and proximate the first road wheel 30, and the second gearing assembly 36 and the second electric machine 58 may be positioned outside the housing 24 and proximate the second road wheel 32.

The vehicle 10 is additionally provided with a plurality of sensors 62. The plurality of sensors 62 may, in various embodiments, include an accelerator pedal sensor, a brake pedal sensor, and speed sensors associated with the road wheels 30 and 32.

At least one controller 64 is in communication with and/or configured to control various components of the vehicle 10 including, but not limited to, the engine 12, the first electric machine 46, the first brake 48, the second electric machine 58, the second brake 60, and the sensors 62. The at least one controller 64 may be a single controller device or multiple cooperating controller devices. The controller(s) 64 and one or more other controllers can collectively be referred to as a "controller." The controller 64 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

Figure 2:
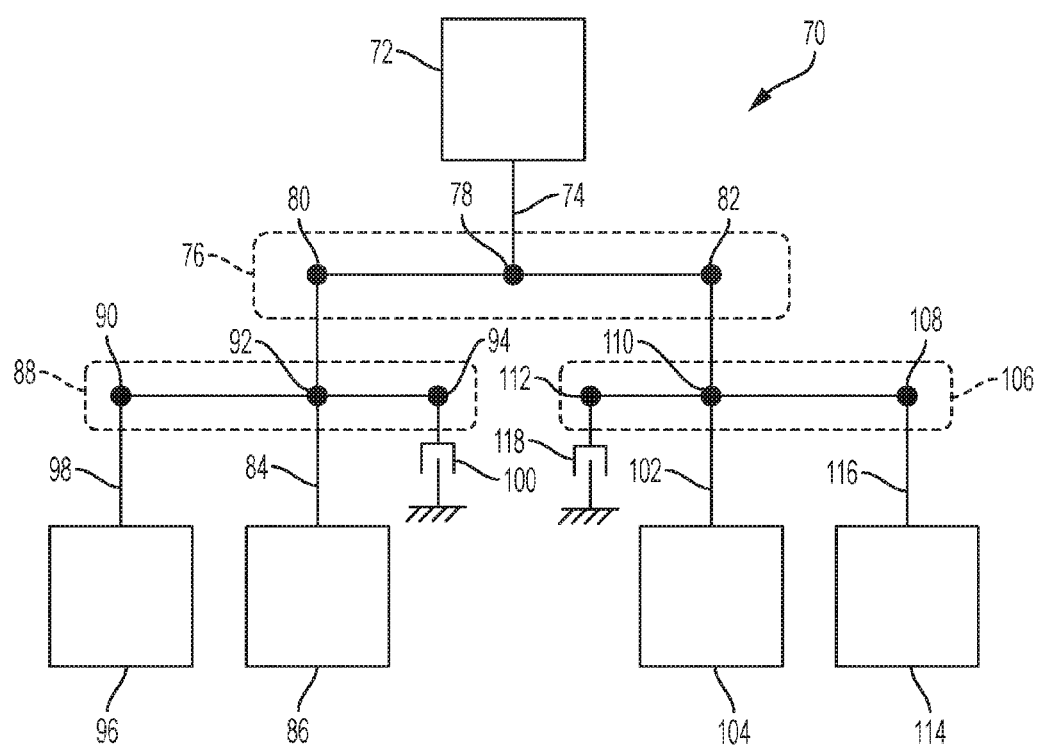
FIG. 2 is a lever diagram representation of a differential assembly according to the present disclosure.

Referring now to FIG. 2, a lever diagram representation of a differential assembly 70 according to the present disclosure is shown. An engine 72 is drivingly coupled by a prop shaft 74 to a differential 76, modeled here as a lever having an input node 78, a first output node 80, and a second output node 82. As may be seen, an increase in speed at the first output node 80 instigates a corresponding decrease in speed at the second output node 82, such that the average speed between the output nodes 80 and 82 is equal to the input speed at the input node 78.

A left half shaft 84 drivingly couples the first output node 80 to a left road wheel 86.

A first gearing assembly 88 is provided and modeled here as a three-node lever having a first node 90, a second node 92, and a third node 94. The first gearing assembly 88 may be a simple planetary gear set, as illustrated in FIG. 1, or other gearing assemblies similarly modeled as a three-node lever. The second node 92 is fixedly coupled to the left half shaft 84.

A left electric machine 96 has an output shaft 98 fixedly coupled to the first node 90. A first brake 100 is configured to selectively brake the third node 94, e.g. hold the corresponding gearing element of the first gearing assembly 88 against rotation.

As may be seen, when the first brake 100 is disengaged, no controlled speed ratio is established between the second node 92 and the first node 90. As the first brake 100 is partially engaged and in a slipping condition, a controlled speed ratio is established between the second node 92 and the first node 90. When the first brake 100 is fully engaged to brake the third node 94, a predefined controlled speed ratio is established between the second node 92 and the first node 90. The predefined controlled speed ratio is determined as a function of the number of teeth of the respective gearing elements of the first gearing assembly 88.

A right half shaft 102 drivingly couples the second output node 82 to a right road wheel 104.

A second gearing assembly 106 is provided and is similarly modeled as a three-node lever having a fourth node 108, a fifth node 110, and a sixth node 112. The second gearing assembly 106 may be a simple planetary gear set, as illustrated in FIG. 1, or other gearing assemblies similarly modeled as a three-node lever. The fifth node 110 is fixedly coupled to the right half shaft 102.

A right electric machine 114 has an output shaft 116 fixedly coupled to the fourth node 108. A second brake 118 is configured to selectively brake the sixth node 112, e.g. hold the corresponding gearing element of the second gearing assembly 106 against rotation.

As may be seen, when the second brake 118 is disengaged, no controlled speed ratio is established between the fifth node 110 and the fourth node 108. As the second brake 118 is partially engaged and in a slipping condition, a controlled speed ratio is established between the fifth node 110 and the fourth node 108. When the second brake 118 is fully engaged to brake the sixth node 112, a predefined controlled speed ratio is established between the fifth node 110 and the fourth node 108. The predefined controlled speed ratio is determined as a function of the number of teeth of the respective gearing elements of the second gearing assembly 106.

A differential assembly according to the present disclosure may be used according to a variety of modes based on a variety of vehicle operating conditions. Various modes are shown in the representative embodiments of FIGS. 2-7 and discussed below. However, a differential assembly according to the present disclosure may also be used in additional operating modes beyond those explicitly disclosed.

In a conventional driving mode, as shown in the exemplary embodiment of FIG. 2, both the first brake 100 and the second brake 118 are disengaged. In the conventional driving mode, drive torque from the engine 72 may be distributed via the differential 76 to the left wheel 86 and the right wheel 104 in a conventional manner, with no additional torque provided by the left electric machine 96 or the right electric machine 114.

Figure 3:
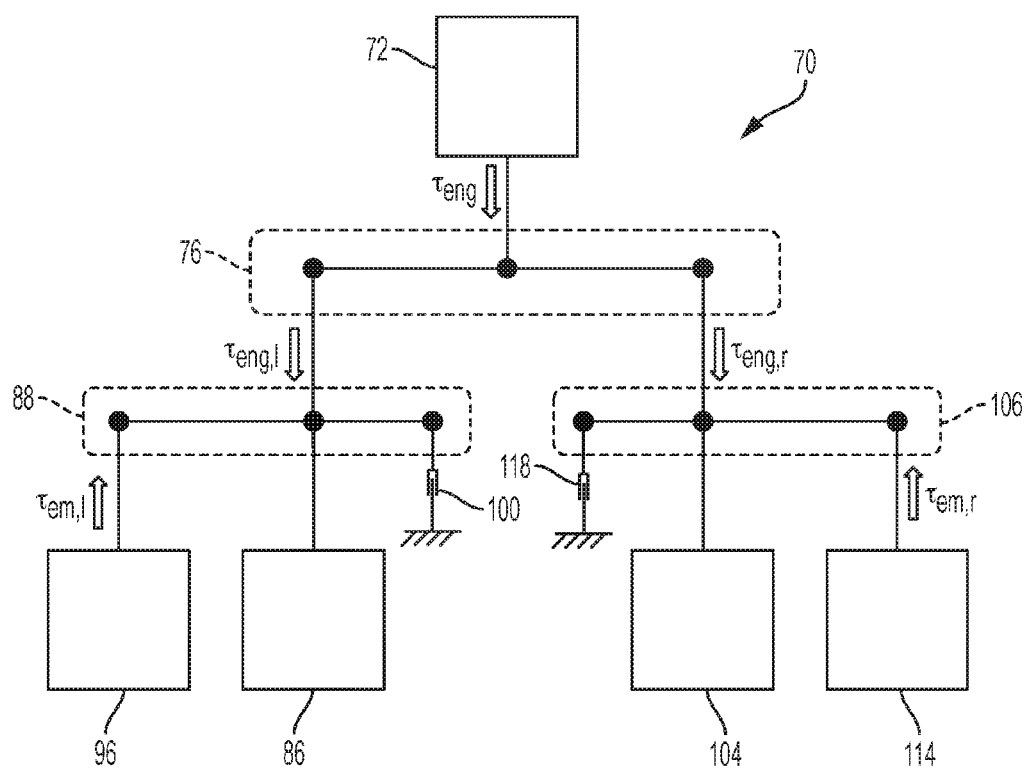
FIG. 3 is a lever diagram representation of a differential assembly operating in a torque boost mode according to the present disclosure.

Referring now to FIG. 3, a lever diagram representation of a differential assembly operating in a torque boost mode according to the present disclosure is shown. In the torque boost mode, both the first brake 100 and the second brake 118 are engaged. Thus, the first gearing assembly 88 establishes a predefined controlled speed ratio between the output shaft of the left electric machine 96 and the left wheel 86. Likewise, the second gearing assembly 106 establishes a predefined controlled speed ratio between the output shaft of the right electric machine 114 and the right wheel 104. The engine 72 is controlled to provide an engine torque $\tau_{eng}$. The differential 76 distributes a first engine torque quantity $\tau_{eng,1}$ to the left wheel 86 and a second engine torque quantity $\tau_{eng,r}$ to the right wheel 104. The left electric machine 96 and the right electric machine 114 are controlled to rotate at a same speed, with the left electric machine 96 being controlled to provide a first electric drive torque $\tau_{em,1}$ and the right electric machine 114 being controlled to provide a second electric drive torque $\tau_{em,r}$. Thus, the first electric drive torque $\tau_{em,1}$ provides an additive torque to the first engine torque quantity $\tau_{eng,1}$, and the second electric drive torque $\tau_{em,r}$ provides an additive torque to the second engine torque quantity $\tau_{eng,r}$.

The torque boost mode may be activated in response to various operating conditions indicative of an operator desire for increased torque. As an example, the torque boost mode may be activated in response to a torque boost condition based on current vehicle speed and throttle position. As another example, the torque boost mode may be activated only when certain vehicle handling modes, such as a so-called Sport Mode, are active.

When the torque boost mode is active, torque response of the vehicle is increased, and thus vehicle acceleration may be improved beyond that available from the engine alone.

In a variation of the torque boost mode, an increased braking mode may be obtained by instead controlling the left electric machine 96 to provide a first resistive torque and the right electric machine 114 to provide a second resistive torque. This mode may be activated in response to an emergency braking condition indicative of a desire for increased braking, such as an operator brake pedal application exceeding a predefined threshold, and/or a diagnostic code indicating a failure in a primary braking system.

Figure 4:
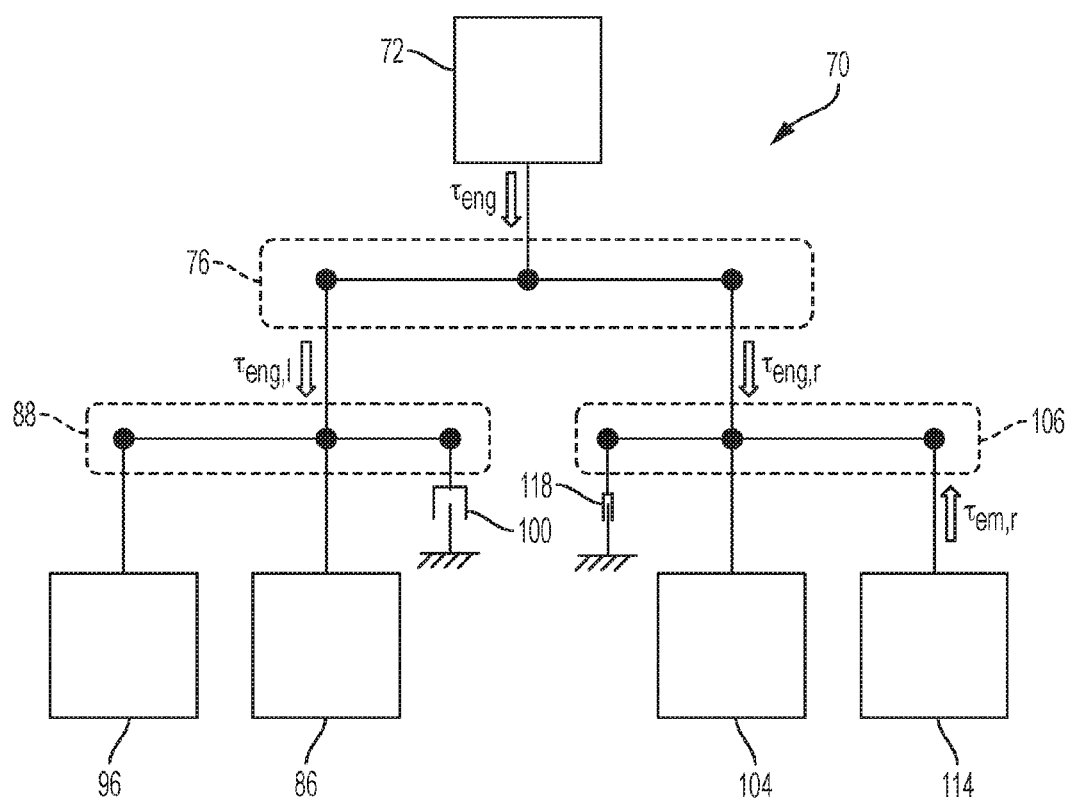
FIG. 4 is a lever diagram representation of a differential assembly operating in a targeted torque mode according to the present disclosure.

Referring now to FIG. 4, a lever diagram representation of a differential assembly operating in a targeted torque mode according to the present disclosure is shown. In the targeted torque mode, one respective brake of the first brake 100 and the second brake 118 is engaged with the other respective brake being disengaged. In the representative embodiment of FIG. 4, the second brake 118 is engaged and the first brake 100 is disengaged. Thus, the second gearing assembly 106 establishes a predefined controlled speed ratio between the output shaft of the right electric machine 114 and the right wheel 104, while the first gearing assembly 88 does not establish any controlled speed ratio. The engine 72 is controlled to provide an engine torque $\tau_{eng}$. The differential 76 distributes a first engine torque quantity $\tau_{eng,1}$ to the left wheel 86 and a second engine torque quantity $\tau_{eng,r}$ to the right wheel 104. The right electric machine 114 is controlled to provide an electric drive torque $\tau_{em,r}$ as an additive torque to the second engine torque quantity $\tau_{eng,r}$.

While the exemplary embodiment of FIG. 4 illustrates a targeted torque mode for providing additive torque for the right wheel 104, as will be understood by one of ordinary skill in the art, the targeted torque mode may alternatively be used to control the left electric machine 96 to provide additive torque for the left wheel 86.

The targeted torque mode may be activated in response to a targeted torque condition based on, for example, detecting a slip condition in one of the wheels. In this mode, the respective electric machine associated with the non-slipping wheel may provide additional torque to the tire that has traction. Thus, the vehicle may continue to operate under slippery conditions.

Figure 5:
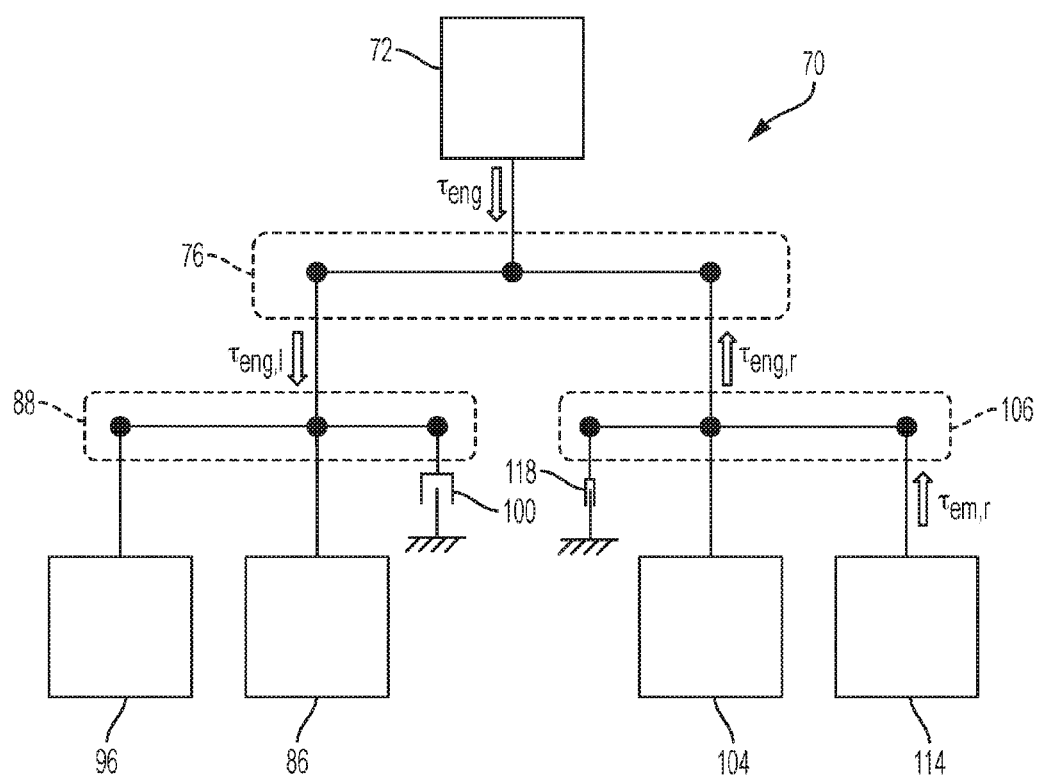
FIG. 5 is a lever diagram representation of a differential assembly operating in a stability control mode according to the present disclosure.

Referring now to FIG. 5, a lever diagram representation of a differential assembly operating in a stability control mode according to the present disclosure is shown. In the stability control mode, one respective brake of the first brake 100 and the second brake 118 is engaged with the other respective brake being disengaged. In the representative embodiment of FIG. 4, the second brake 118 is engaged and the first brake 100 is disengaged. Thus, the second gearing assembly 106 establishes a predefined controlled speed ratio between the output shaft of the right electric machine 114 and the right wheel 104, while the first gearing assembly 88 does not establish any controlled speed ratio. The engine 72 is controlled to provide an engine torque $\tau_{eng}$. The differential 76 distributes a first engine torque quantity $\tau_{eng,1}$ to the left wheel 86 and a second engine torque quantity $\tau_{eng,r}$ to the right wheel 104. The right electric machine 114 is controlled to provide a resistive drive torque $\tau_{em,r}$ as an opposite torque to the second engine torque quantity $\tau_{eng,r}$.

While the exemplary embodiment of FIG. 5 illustrates a stability control mode for providing resistive drive torque to the right wheel 104, as will be understood by one of ordinary skill in the art, the stability control mode may alternatively be used to control the left electric machine 96 to provide resistive drive torque for the left wheel 86.

The stability control mode may be activated in response to a stability control condition based on a detected loss of stability, such as detecting overspin in a road wheel. In the stability control mode, vehicle stability may be regained by redirecting torque to the wheel with traction.

Figure 6:
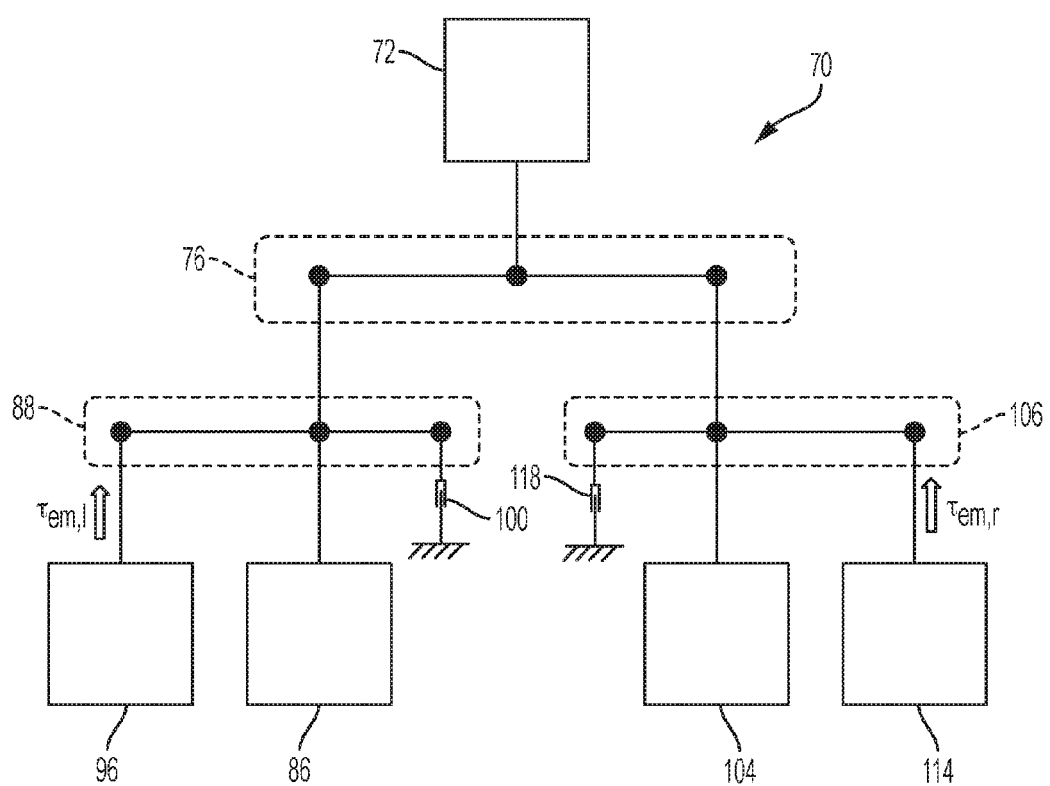
FIG. 6 is a lever diagram representation of a differential assembly operating in an electric drive mode according to the present disclosure.

Referring now to FIG. 6, a lever diagram representation of a differential assembly operating in an electric drive mode according to the present disclosure is shown. In the electric drive mode, both the first brake 100 and the second brake 118 are engaged. Thus, the first gearing assembly 88 establishes a predefined controlled speed ratio between the output shaft of the left electric machine 96 and the left wheel 86. Likewise, the second gearing assembly 106 establishes a predefined controlled speed ratio between the output shaft of the right electric machine 114 and the right wheel 104. The engine 72 is stopped, i.e. providing no torque to the differential 76. The left electric machine 96 and the right electric machine 114 are controlled to rotate, preferably at a same speed, with the left electric machine 96 being controlled to provide a first electric drive torque $\tau_{em,1}$ and the right electric machine 114 being controlled to provide a second electric drive torque $\tau_{em,r}$. Thus, the first electric drive torque $\tau_{em,1}$ provides all of the drive torque to the left wheel 86 and the second electric drive torque $\tau_{em,r}$ provides all of the drive torque to the right wheel 104.

The electric drive mode may be activated in response to an electric drive condition based on a variety of operating parameters, generally similar to those utilized in known HEV or PHEV configurations. These parameters include, but are not limited to, throttle position and application rate, battery state of charge, engine stopped or start state, and a current vehicle handling mode such as a so-called Economy Mode.

Figure 7:
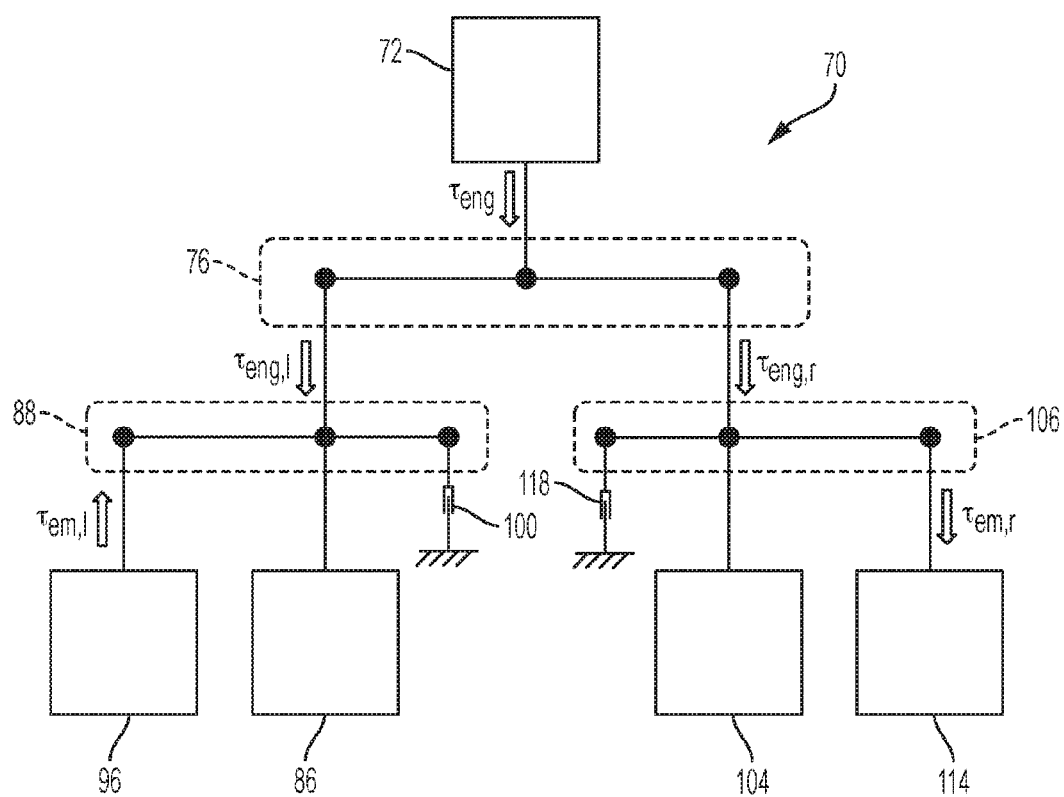
FIG. 7 is a lever diagram representation of a differential assembly operating in a steer assist mode according to the present disclosure.

Referring now to FIG. 7, a lever diagram representation of a differential assembly operating in a parking assist or steering redundancy mod according to the present disclosure is shown. In these modes, both the first brake 100 and the second brake 118 are engaged. Thus, the first gearing assembly 88 establishes a predefined controlled speed ratio between the output shaft of the left electric machine 96 and the left wheel 86. Likewise, the second gearing assembly 106 establishes a predefined controlled speed ratio between the output shaft of the right electric machine 114 and the right wheel 104. The engine 72 is controlled to provide an engine torque $\tau_{eng}$. The differential 76 distributes a first engine torque quantity $\tau_{eng,1}$ to the left wheel 86 and a second engine torque quantity $\tau_{eng,r}$ to the right wheel 104. The left electric machine 96 and the right electric machine 114 are controlled to rotate at different speeds, with the left electric machine 96 being controlled to provide a first electric torque $\tau_{em,1}$ and the right electric machine 114 being controlled to provide a second electric torque $\tau_{em,r}$. In this embodiment, the first electric torque $\tau_{em,1}$ is a drive torque and the second electric torque $\tau_{em,r}$ is a resistive torque. However, in other embodiments, other combinations of drive torque and resistive torque may be used. Due to the speed differential between the left electric machine 96 and the right electric machine 114, a speed differential is produced between the left wheel 86 and the right wheel 104 to steer the vehicle.

In a variation of the mode illustrated in FIG. 7, the parking assist mode or steering redundancy mode may be used in the absence of engine torque, i.e. with engine torque $\tau_{eng}$ being equal to zero.

As stated previously, this may be a parking assist mode or a steering redundancy mode. The parking assist mode may be activated in response to a parking assist condition based on an operator request. In the parking assist mode, the speed differential between the left wheel 86 and the right wheel 104 decreases the turning radius, enabling increased maneuverability and easier parking. The steering redundancy mode may be activated in response to a redundant steering condition, based on a steering input from an operator in conjunction with a diagnostic code indicating a detected mechanical or electric steering failure. In the steering redundancy mode, the speed differential between the left wheel 86 and the right wheel 104 provides a limited steering functionality in the absence of a primary steering system.

Figure 8:
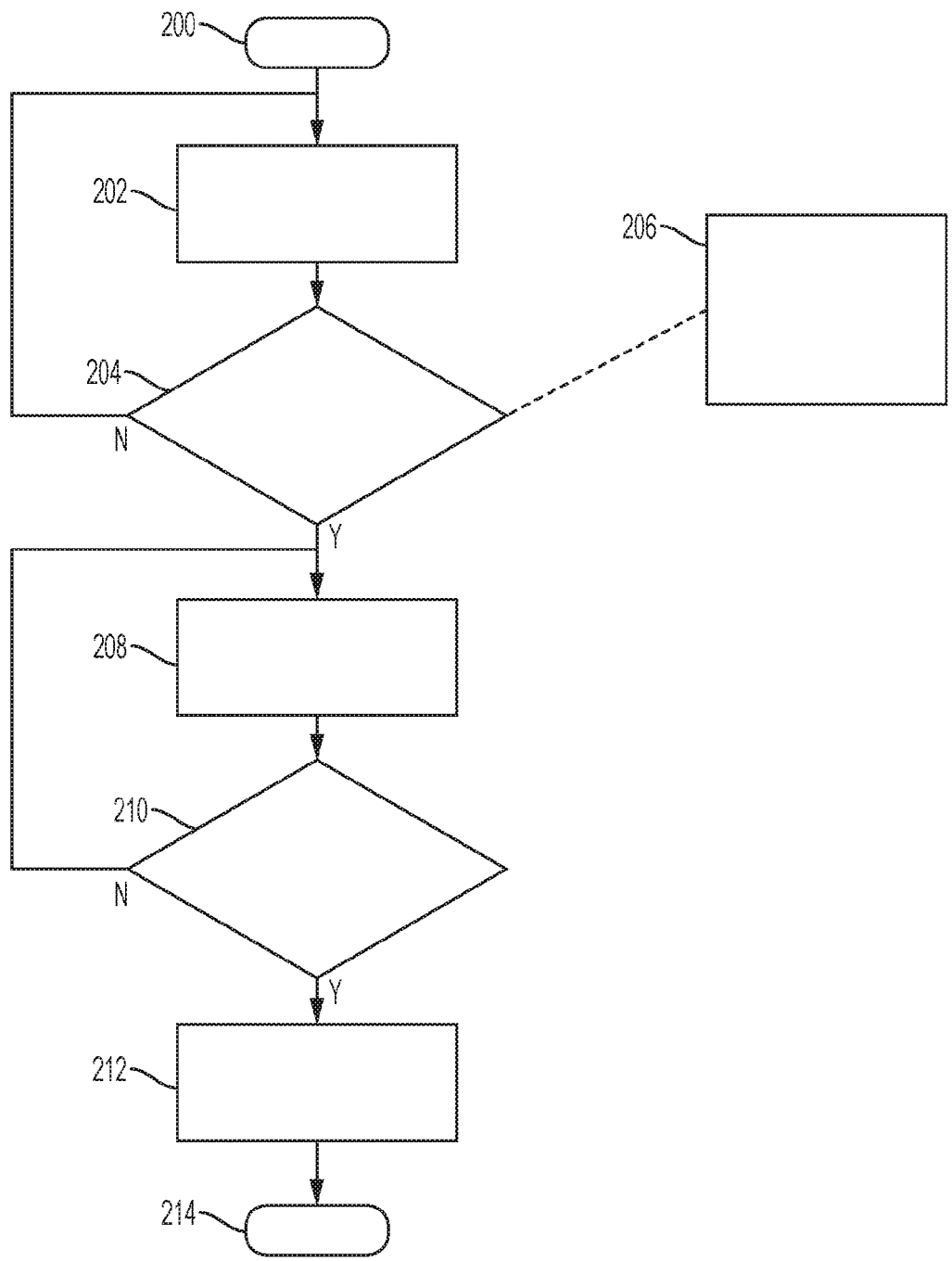
FIG. 8 is a flowchart representation of a method of controlling a vehicle according to the present disclosure.

Referring now to FIG. 8, a flowchart representation of a method of controlling a vehicle according to the present disclosure is shown. The method begins at block 200. The vehicle is controlled according to a default mode, as shown in block 200. The default mode may be a conventional drive mode, as shown in the illustrative embodiment of FIG. 2, or other mode as appropriate.

At operation 204, a determination is made of whether an operating condition associated with an alternate mode is detected. As shown at block 206, an operating condition associated with an alternate drive mode may include, for example, a torque boost condition, an emergency braking condition, an electric drive condition, a targeted torque condition, a stability control condition, a parking assistant condition, or a redundant steering condition.

If the determination of operation 204 is negative, i.e. no operating condition associated with an alternate mode is detected, then control returns to block 202. Thus, the vehicle is controlled according to the default mode unless and until an operating condition associated with an alternate mode is detected.

If the determination of operation 204 is positive, i.e. an operating condition associated with an alternate mode is detected, then the vehicle is controlled in the alternate mode associated with the detected operating condition, as shown at block 208. This may include controlling at least one electric machine and at least one brake as shown, for example, in the various operating modes illustrated in FIGS. 2-7.

At operation 210, a determination is made of whether the operating condition associated with the alternate mode is terminated, e.g. the respective condition shown in block 206 has ceased.

If the determination of operation 210 is negative, i.e. the operating condition associated with the alternate drive mode has not terminated, then control returns to block 208. Thus, the vehicle is controlled according to the alternate mode unless and until the operating condition associated with the alternate mode is terminated.

If the determination of operation 210 is positive, i.e. the operating condition associated with the alternate drive mode has terminated, then the vehicle is controlled according to the default mode, as illustrated at block 212. The algorithm ends at block 214. The algorithm may subsequently be run again by returning to block 200.

In some embodiments, an arbitration control is provided to arbitrate between different operating modes when operating conditions associated with multiple operating modes are detected. The arbitration control may be preconfigured to prioritize certain operating modes as desired.

Variations on the above-described system and method are, of course, possible. For example, some embodiments may make use of primary motive power sources other than an internal combustion engine, such as a primary drive motor. As another example, some embodiments may be used in vehicles having autonomous driving systems rather than, or in addition to, a human operator.

As may be seen, systems and methods according to the present disclosure provide a vehicle with improved mobility and handling, improved fuel economy, and system redundancy, thus increasing customer satisfaction.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

What is claimed is:

1. A vehicle, comprising:
   an engine;
   a differential operatively coupled to the engine;

a first road wheel;
a first half shaft drivingly coupling the differential to the first road wheel;
a first electric machine having a first output shaft;
a first planetary gear set having a first sun gear, a first planet carrier, and a first ring gear, the first sun gear being fixedly coupled with the first output shaft, the first planet carrier being fixedly coupled with the first half shaft;
a first brake configured to selectively hold the first ring gear against rotation;
a second road wheel;
a second half shaft drivingly coupling the differential to the second road wheel;
a second electric machine having a second output shaft;
a second planetary gear set having a second sun gear, a second planet carrier, and a second ring gear, the second sun gear being fixedly coupled with the second output shaft, the second planet carrier being fixedly coupled with the second half shaft; and
a second brake configured to selectively hold the first ring gear against rotation.

2. The vehicle of claim 1, further comprising a controller configured to selectively control the first brake in a first brake engaged state with the first ring gear held against rotation and in a first brake disengaged state with the first ring gear not held against rotation, to selectively control the second brake in a second brake engaged state with the second ring gear held against rotation and in a second brake disengaged state with the second ring gear not held against rotation, to selectively control the first electric machine to provide drive torque and to provide resistive torque, and to selectively control the second electric machine to provide drive torque and to provide resistive torque.

3. The vehicle of claim 2, wherein the controller is further configured to, in response to at least one sensor input corresponding to a torque boost condition or an emergency braking condition, control the first brake in the first brake engaged state, control the second brake in the second brake engaged state, and control the first electric machine and the second electric machine to provide torque and to rotate at a same speed.

4. The vehicle of claim 2, wherein the controller is further configured to, in response to at least one sensor input corresponding to an electric drive condition, control the first brake in the first brake engaged state, control the second brake in the second brake engaged state, and control the first electric machine and the second electric machine to provide drive torque in the absence of drive torque from the engine.

5. The vehicle of claim 2, wherein the controller is further configured to, in response to at least one sensor input corresponding to a parking assist condition or a redundant steering condition, control the first brake in the first brake engaged state, control the second brake in the second brake engaged state, and to control the first electric machine to rotate at a first speed and the second electric machine to rotate at a second speed, distinct from the first speed, to produce a speed differential between the first half shaft and the second half shaft.

6. The vehicle of claim 2, wherein the controller is further configured to, in response to at least one sensor input corresponding to a targeted torque condition, control the first brake in the first brake engaged state, control the second brake in the second brake disengaged state, and to control the first electric machine to deliver drive torque to the first road wheel.

7. The vehicle of claim 2, wherein the controller is further configured to, in response to at least one sensor input corresponding to a stability control condition, control the first brake in the first brake engaged state, control the second brake in the second brake disengaged state, and to control the first electric machine to deliver resistive torque to the first road wheel.

8. A differential assembly for a vehicle comprising:
a differential;
a prop shaft configured to drivingly couple the differential to a motive power source;
a first half shaft configured to drivingly couple the differential to a first road wheel;
a second half shaft configured to drivingly couple the differential to a second road wheel;
a first electric machine having a first output shaft;
a second electric machine having a second output shaft;
a first gearing assembly configured to selectively impose a controlled speed ratio between the first half shaft and the first output shaft, the first gearing assembly including a first gearing element coupled to the first output shaft, a second gearing element fixedly coupled to the first half shaft, and a third gearing element;
a second gearing assembly configured to selectively impose a controlled speed ratio between the second half shaft and the second output shaft, the second gearing assembly including a fourth gearing element coupled to the second output shaft, a fifth gearing element fixedly coupled to the second half shaft, and a sixth gearing element;
a first brake configured to selectively hold the third gearing element against rotation; and
a second brake configured to selectively hold the sixth gearing element against rotation.

9. The differential assembly of claim 8 wherein the first gearing element includes a first sun gear, the second gearing element includes a first planet carrier, and the third gearing element includes a first ring gear, and wherein the fourth gearing element includes a second sun gear, the fifth gearing element includes a second planet carrier, and the sixth gearing element includes a second ring gear.

10. The differential assembly of claim 8, further comprising a housing, wherein the differential, the first half shaft, the second half shaft, the first electric machine, the second electric machine, the first gearing assembly, and the second gearing assembly are disposed at least partially within the housing.

11. The differential assembly of claim 8, further comprising a controller configured to control the first gearing assembly to selectively operate in a first gearing assembly first mode with the controlled speed ratio between the first half shaft and the first output shaft and in a first gearing assembly second mode with no controlled speed ratio between the first half shaft and the first output shaft, and to control the second gearing assembly to selectively operate in a second gearing assembly first mode with the controlled speed ratio between the second half shaft and the second output shaft and in a second gearing assembly second mode with no controlled speed ratio between the second half shaft and the second output shaft.

12. The differential assembly of claim 11, wherein the controller is further configured to, in response to a first set of operating conditions, control the first gearing assembly in the first gearing assembly first mode and control the second gearing assembly in the second gearing assembly first mode.

13. The differential assembly of claim 12, wherein the first set of operating conditions includes a torque boost operating condition or an emergency braking operating condition, and wherein the controller is further configured to control the first electric machine and the second electric machine to rotate at a same speed and to provide torque.

14. The differential assembly of claim 12, wherein the first set of operating conditions includes an electric drive operating condition, and wherein the controller is further configured to control the first electric machine and the second electric machine to rotate at a same speed and to provide drive torque with the motive power source providing no drive torque.

15. The differential assembly of claim 12, wherein the first set of operating conditions includes a redundant steering condition or a parking assist condition, and wherein the controller is further configured to control the first electric machine to rotate at a first speed and the second electric machine to rotate at a second speed, distinct from the first speed, to produce a speed differential between the first road wheel and the second road wheel.

16. The differential assembly of claim 11, wherein the controller is further configured to, in response to a second set of operating conditions, control the first gearing assembly in the first gearing assembly first mode and control the second gearing assembly in the second gearing assembly second mode.

17. The differential assembly of claim 16, wherein the second set of operating conditions includes a targeted torque condition, and wherein the controller is further configured to control the first electric machine to deliver drive torque to the first road wheel.

18. The differential assembly of claim 16, wherein the second set of operating conditions includes a stability control entry condition, and wherein the controller is further configured to control the first electric machine to deliver resistive torque to the first road wheel.

19. A method of controlling a vehicle, comprising:

providing a vehicle including a motive power source, a differential operatively coupled to the motive power source, a first half shaft configured to drivingly couple the differential to a first road wheel, a second half shaft configured to drivingly couple the differential to a second road wheel, a first electric machine having a first output shaft, a second electric machine having a second output shaft, a first gearing assembly configured to selectively impose a controlled speed ratio between the first half shaft and the first output shaft, and a second gearing assembly configured to selectively impose a controlled speed ratio between the second half shaft and the second output shaft;

in response to a first operating condition being satisfied, controlling the first gearing assembly to impose the controlled speed ratio between the first half shaft and the first output shaft and controlling the second gearing assembly to impose no controlled speed ratio between the second half shaft and the second output shaft; and in response to the first operating condition not being satisfied, controlling the first gearing assembly to impose no controlled speed ratio between the first half shaft and the first output shaft and controlling the second gearing assembly to impose no controlled speed ratio between the second half shaft and the second output shaft.

20. The method of claim 19, further comprising:

in response to a second operating condition being satisfied, controlling the first gearing assembly to impose the controlled speed ratio between the first half shaft and the first output shaft and controlling the second gearing assembly to impose the controlled speed ratio between the second half shaft and the second output shaft.

* * * * *